US005867715A

United States Patent [19]

Lin et al.

[11] Patent Number: 5,867,715

[45] Date of Patent: Feb. 2, 1999

[54] APPARATUS FOR PROGRAMMABLY CONVERTING AN OPERATING VOLTAGE OF A CPU AND CHIPSET

[75] Inventors: Wen-chung Lin; Chih-ping Huang; Hsan-yueh Fang, all of Taipei, Taiwan

[73] Assignee: ABIT Computer Corporation, Taipei, Taiwan

[21] Appl. No.: 735,203

[22] Filed: Oct. 21, 1996

[51] Int. Cl.[6] .............................. G06F 1/26

[52] U.S. Cl. .............................. 395/750.01; 326/80

[58] Field of Search .............................. 326/80; 323/222, 323/285; 395/750.01

[56] References Cited

U.S. PATENT DOCUMENTS

| | | | |
|---|---|---|---|
| 4,584,517 | 7/1996 | Schwob | 323/22 |
| 5,444,298 | 8/1995 | Schutz | 257/691 |
| 5,534,771 | 7/1996 | Massie | 323/285 |
| 5,602,792 | 2/1997 | Kanaishi | 365/226 |
| 5,691,654 | 11/1997 | Green et al. | 326/80 |

*Primary Examiner*—Glenn A. Auve
*Attorney, Agent, or Firm*—Kirkpatrick & Lockhart LLP

[57] ABSTRACT

An apparatus for programmably converting the operating voltage of a CPU & chipset by means of the firmware programmably setting the operating voltage, instead of by means of adjusting jumpers, is disclosed. The apparatus includes an address decoder unit, a programmable data memory, a DC to DC converter and a feedback resistance switching circuit. In operation, the computer inputs an address signal and a data signal required for changing the operating voltage to the address decoder unit. After being decoded, the data is written into the programmable data memory. Then the programmable data memory outputs a selection signal to change the internal resistance of the feedback resistance switching circuit, thereby to convert the output voltage of the DC to DC converter.

13 Claims, 3 Drawing Sheets

APPARATUS FOR PROGRAMMABLY CONVERTING AN OPERATING VOLTAGE OF A CPU AND CHIPSET

BACKGROUND OF THE INVENTION

1. Field of the Invention

The present invention relates to an apparatus for programmably converting an operating voltage of a CPU and chipset, and more particularly to an apparatus for programmably converting an operating voltage of a CPU and chipset by means of a firmware, instead of by a jumper.

2. Description of Related Art

Recently, with the increase of computer manufacturers and the differences of their manufacture techniques, the specifications of operating voltages of the central processing units (CPU) and the chipset have become various. For example, for a Pentium® (Pentium® is a registered trademark of Intel Corporation) CPU used in a personal computer, the operating voltages of the CPUs manufactured by INTEL, CYRIX and AMD are different. Even though the CPUs are produced by one manufacturer, they are distinct. For instance, the SSS numbered in a back of the Pentium® CPU indicates an operating voltage of 3.3 volts and the VMU indicates an operating voltage of 3.45 volts. While a CYRIX CPU has the operating voltages such as 3.3 volts and 3.52 volts according to its number. Also, a high frequency CPU requiring a voltage regulation module (VRM) has the operating voltages such as 2.5 volts and 2.7 volts. Consequently, to support above mentioned CPUs, the manufacturers have to provide a plurality sets of jumpers or built-in voltage converters within a computer for users to adjust the operating voltage of the CPU and the chipset.

FIG. 1 shows a schematic view of a conventional regulation circuit. The conventional regulation circuit comprises a DC to DC converter 10, a feedback resistor Rf and a fixed resistor R1. Said feedback resistor Rf and the fixed resistor R1 form a resistance multiplying circuit for enabling the output voltage Vout to input a reference voltage Vref, through the multiplying circuit, to the DC to DC converter 10, thereby to change the resistance of the feedback resistor Rf, the reference voltage Vref and thus the output voltage Vout of the DC to DC converter 10. To send out a group of various voltages from above mentioned structure, a set of jumpers cooperating with resistors of different resistances are used in the regulation circuit, which is the most popular method used nowadays. As shown in FIG. 2, which shows a schematic view of a conventional multistage regulation circuit according to above method, the regulation circuit uses three feedback resistors 21 each connected in series with a jumper set 22. By this arrangement, various feedback resistances are obtained and the operating voltage can be changed.

It is understood that this kind of apparatus and method has several disadvantages. One is that a series of steps such as disassembling the computer, comparing with the handbook and adjusting the jumper or switch are required when the operating voltage is desired to be adjusted. A second disadvantage is that using the jumper for selectively skip connecting may cause an error set. A third disadvantage is that the metal jumper may be aged and oxidized due to humidity and may cause a defective contact. Therefore, there is a need for above apparatus to be improved.

The present invention provides an improved apparatus for programmably converting the operating voltage of a CPU & chipset to mitigate and/or obviate the aforementioned problems.

SUMMARY OF THE INVENTION

One object of the present invention is to provide an apparatus for programmably converting an operating voltage of a CPU & chipset by means of a firmware BIOS setting the operating voltage, instead of by adjusting a set of jumpers.

Another object of the present invention is to provide an apparatus for programmably converting an operating voltage of a CPU & chipset which has a flash EEPROM acting as a programmable data memory to write and lock the data.

A further object of the present invention is to provide an apparatus for programmably converting an operating voltage of a CPU & chipset which has a data register cooperated with a rechargeable battery to write and lock the data.

In accordance with one aspect of the present invention, the apparatus for programmably converting an operating voltage of a CPU & chipset includes an impedance converting circuit connected between an output of a DC to DC converter and an input of a reference voltage. An input of the impedance converting circuit is connected with an address/data bus of the CPU and the chipset so that the bus inputs digital data representative of a certain address and the operating voltage, respectively, whereby the impedance converting circuit transforms the actual impedance thereof according to said data.

In accordance with another aspect of the present invention, the impedance converting circuit further comprises an address decoder unit for decoding and transferring the input address data, a programmable data memory having a nonvolatile memory element for receiving, writing and locking the data signal input by the address decoder unit, and a feedback resistance switching circuit having an input connected with an output of the programmable data memory to change the internal equivalent resistance thereof according to the output state of the data memory.

In accordance with a further aspect of the present invention, the feedback resistance switching circuit is composed of a plurality of transistors each connected in series with a resistor, the base electrode of each transistor acting as a signal input connected with the programmable data memory.

In accordance with still a further aspect of the present invention, an apparatus for programmably converting an operating voltage of a CPU and chipset includes an address decoder unit for decoding and transferring the input address data, an input of the address decoder unit being connected with an address/data bus of the CPU and the chipset so that the bus inputs digital data representative of a certain address and the operating voltage, respectively, a programmable data memory having a nonvolatile memory element for receiving, writing and locking the data signal input by the address decoder unit, and a feedback resistance switching circuit connected between an output of a DC to DC converter and an input of a reference voltage, the feedback resistance switching circuit having an input connected with an output of the programmable data memory to change the internal equivalent resistance thereof according to the output state of the data memory.

Other objects, advantages and novel features of the invention will become more apparent from the following detailed description when taken in conjunction with the accompanying drawings.

DETAILED DESCRIPTION OF PREFERRED EMBODIMENT

Figure 1:
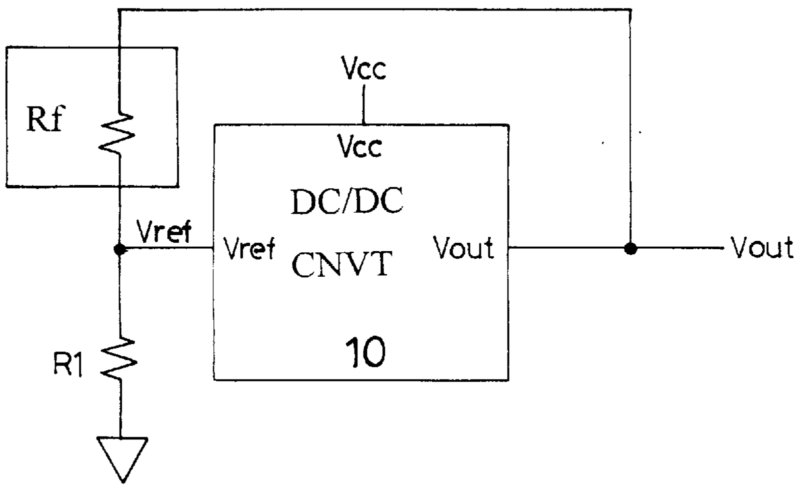
FIG. 1 PRIOR ART
FIG. 1 is a schematic view showing a conventional regulation circuit.
Figure 2:
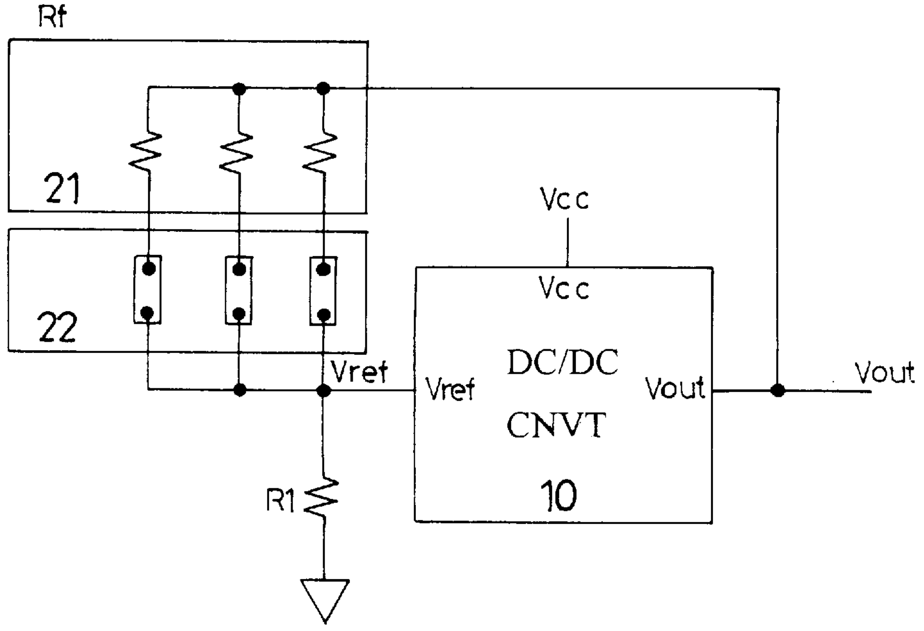
FIG. 2 PRIOR ART
FIG. 2 is a schematic view showing a conventional multistage regulation circuit.
Figure 3:
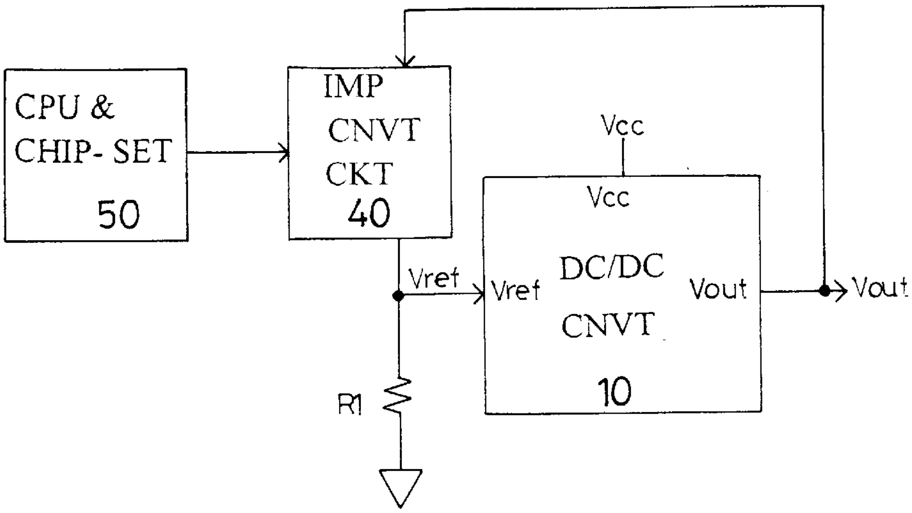
FIG. 3 is a schematic view showing the structure of an apparatus for programmably converting an operating voltage of a CPU and chipset in accordance with the present invention.

Referring to FIG. 3, an apparatus for programmably converting an operating voltage of a CPU and chipset in accordance with the present invention uses an impedance converting circuit 40, instead of the feedback resistor Rf shown in FIG. 1 and FIG. 2. The impedance converting circuit 40 operates to convert the output voltage Vout of the DC to DC converter 10 according to the various operating voltage data input by the bus of the CPU & chipset 50. It is appreciated that this apparatus has no jumper and omits the complex operations of adjusting the jumpers. Also, the impedance converting circuit 40 has a programmable data memory for storing and writing the data so that the data will not be modified before re-execution.

Figure 4:
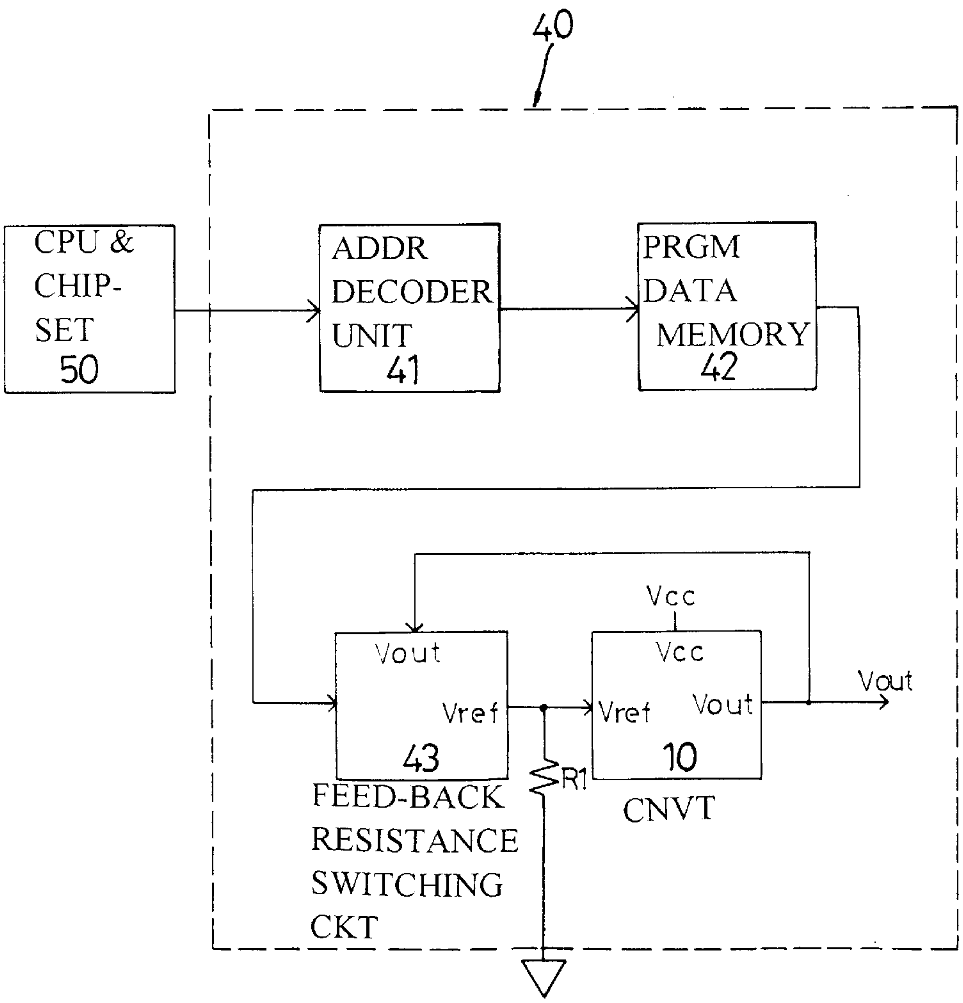
FIG. 4 is a block view showing the structure of the apparatus in accordance with the present invention.

The construction of the impedance converting circuit 40 is shown in FIG. 4. The converting circuit 40 comprises an address decoder unit 41, an programmable data memory 42, which may be a FLASH EEPROM, connected with the address decoder unit 41, and a feedback resistance switching circuit 43 controlled by the programmable data memory 42. The address decoder unit 41 receives and decodes the address and digital data input by the CPU & chipset 50. After identifying the address data, the address decoder unit 41 generates a trigger signal and writes the input data of operating voltage to the programmable data memory 42. Since the content of the programmable data memory 42 is changed in the above manner, each output signal of the memory 42 will be changed, thereby a switching state and resistance of an internal feedback resistor of the feedback resistance switching circuit 43, and thus the voltage input to the DC to DC converter 10 and the output operating voltage Vout are changed.

Figure 5:
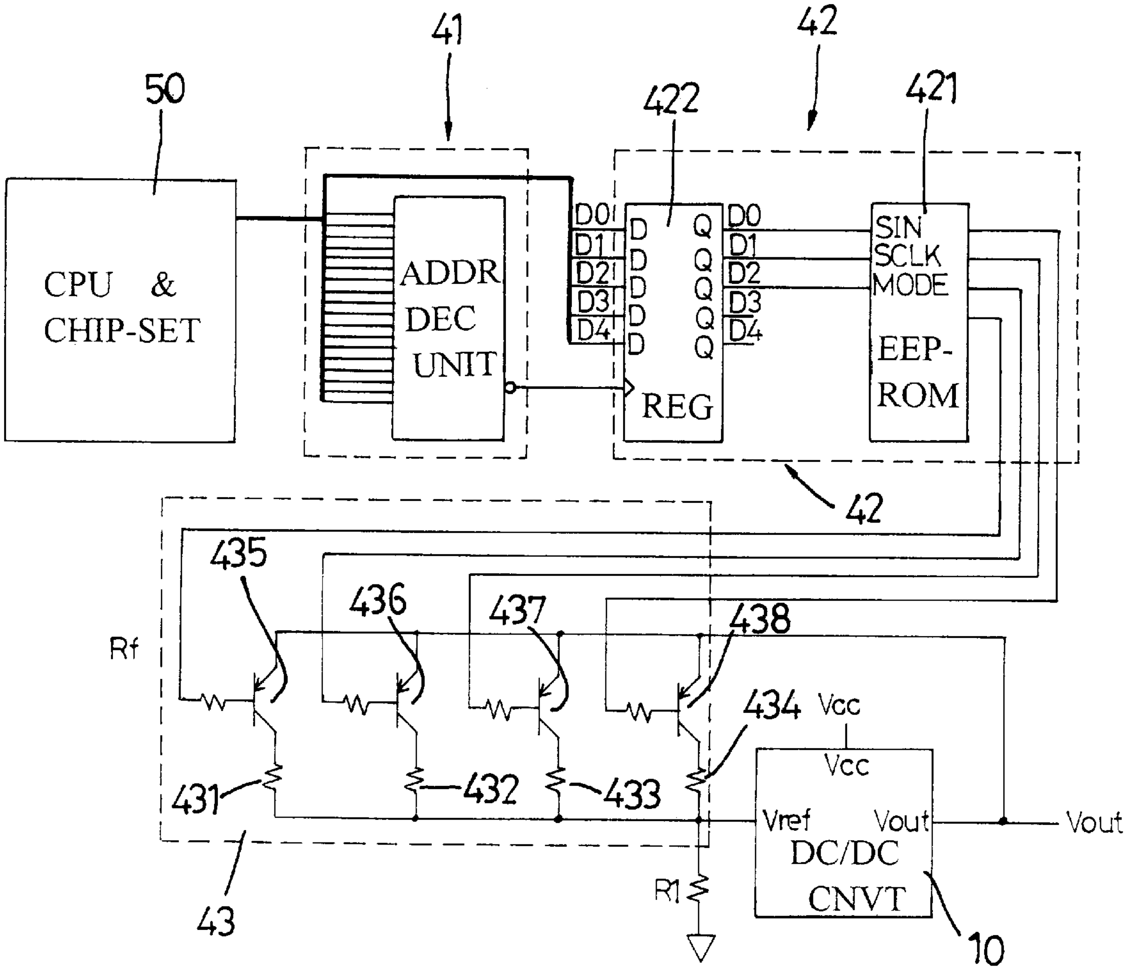
FIG. 5 is a circuit diagram showing the detail of the preferred embodiment of the apparatus in accordance with the present invention.

FIG. 5 shows a circuit diagram of the detail of the preferred embodiment of the apparatus in accordance with the present invention. The address decoder unit 41 receives the address data input by the CPU & chipset 50. The decode output acts as a sequence signal for actuating the programmable data memory 42. The programmable data memory 42 includes a programmable burner 421 and a register 422. The decode output of the address decoder unit 41 is connected with a sequence input of the data register 422. A data input of the data register 422 is connected with the data bus to receive the data representative of the operating voltage on the bus. The programmable burner 421 is a programmable memory EEPROM. A signal input SIN, a sequence input SCLK and a mode input MODE of the programmable burner 421 are connected with each output signal of the data register 422. The feedback resistance switching circuit 43 includes a plurality of transistors 435–438 connected in series with corresponding resistors 431˜434. The base electrode of each transistor 435˜438 is connected with each output of the programmable burner 421.

When the CPU & chipset 50 output the address signal which is to be adjusted and input the data representative of the operating voltage at the bus by means of the firmware or the software of the system, the address decoder unit 41 decodes the address signal. After identifying the address signal, the address decoder unit 41 outputs a sequence pulse so that the data representative of the operating voltage on the data bus can be transferred into the programmable burner 421 via the data register 422. Then the programmable burner 421 executes the step of "sequencing" (writing) according to the input data signals to modify the content of the thereof and change the output electrical level states thereof. Thereby, the transistors within the feedback resistance switching circuit 43 are turned on or turned off. With the combination of each resistor 431˜434, the internal actual resistance thereof can be changed, whereby to change the voltage output by the DC to DC converter 10.

Also, above mentioned programmable data memory 42 is provided for locking and keeping data so that in another preferred embodiment, a data register cooperated with a recharging circuit having a rechargeable battery can be used for this purpose.

Accordingly, the present invention provides an apparatus for programmably converting the operating voltage of a CPUT & chipset by means of setting on the screen of the computer, instead of by changing or adjusting a plurality of jumpers. In other words, a series of steps of disassembling the computer, looking up the handbook, adjusting the jumpers, etc. can be omitted and the problems involved in a conventional apparatus such as an error adjustment, an unstable host and a reduced working life of the CPU can be avoided. Furthermore, the present invention is controlled by program and the switching control circuit thereof is of total electronic design so that problems of oxidization and defective control can be prevented.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for programmably converting an operating voltage of a CPU and chipset comprising:

an impedance converting circuit connected between an output of a DC to DC converter and an input of a reference voltage, an input of the impedance converting circuit being connected with an address/data bus of the CPU and the chipset so that the bus inputs digital data representative of a certain address and the operating voltage, respectively, whereby the impedance converting circuit transforms the actual impedance thereof according to said data.

2. The apparatus for programmably converting an operating voltage of a CPU and chipset as claimed in claim 1, wherein said impedance converting circuit further comprises:

an address decoder unit for decoding and transferring the input digital data;

a programmable data memory having a nonvolatile memory element for receiving a data signal input by the address decoder unit; and a feedback resistance switching circuit having an input connected with an output of the programmable data memory to change an internal equivalent resistance thereof according to an output state of the programmable data memory.

3. The apparatus for programmably converting an operating voltage of a CPU and chipset as claimed in claim 2, wherein said address decoder unit is a decoder.

4. The apparatus for programmably converting an operating voltage of a CPU and chipset as claimed in claim 3, wherein an output of said address decoder unit is provided for inputting said data signal to the programmable data memory.

5. The apparatus for programmably converting an operating voltage of a CPU and chipset as claimed in claim 2, wherein said programmable data memory includes a data register and a EEPROM.

6. The apparatus for programmably converting an operating voltage of a CPU and chipset as claimed in claim 2, wherein said programmable data memory includes a data register and a rechargeable battery.

7. The apparatus for programmably converting an operating voltage of a CPU and chipset as claimed in claim 2, wherein said feedback resistance switching circuit is composed of a plurality of transistors each connected in series with a resistor, the base electrode of each transistor acting as a signal input connected with the programmable data memory.

8. An apparatus for programmably converting an operating voltage of a CPU and chipset comprising:

an address decoder unit for decoding and transferring an input digital data, an input of the address decoder unit being connected with an address/data bus of the CPU and chipset so that the bus inputs the digital data representative of a certain address and the operating voltage, respectively;

a programmable data memory having a nonvolatile memory element for receiving a data signal input by the address decoder unit; and a feedback resistance switching circuit connected between an output of a DC to DC converter and a reference voltage input of said DC to DC converter, said feedback resistance switching circuit having an input connected with an output of the programmable data memory to change an internal equivalent resistance of said feedback resistance switching circuit according to an output state of the programmable data memory.

9. The apparatus for programmably converting an operating voltage of a CPU and chipset as claimed in claim 8, wherein said address decoder unit is a decoder.

10. The apparatus for programmably converting an operating voltage of a CPU and chipset as claimed in claim 8, wherein an output of said address decoder unit is provided for inputting said data signal to the programmable data memory.

11. The apparatus for programmably converting an operating voltage of a CPU and chipset as claimed in claim 8, wherein said programmable data memory includes a data register and an EEPROM.

12. The apparatus for programmably converting an operating voltage of a CPU and chipset as claimed in claim 8, wherein said programmable data memory includes a data register and a battery.

13. The apparatus for programmably converting an operating voltage of a CPU and chipset as claimed in claim 8, wherein said feedback resistance switching circuit is composed of a plurality of transistors each connected in series with a resistor, the base electrode of each transistor acting as a signal input connected with the programmable data memory.

* * * * *